United States Patent [19]

Hara

[11] 4,441,386
[45] Apr. 10, 1984

[54] WIRE CUTTER AND STRIPPER APPARATUS

[75] Inventor: Akinori Hara, Akishima, Japan

[73] Assignee: Osawa Press Mfg., Co., Ltd., Tokyo, Japan

[21] Appl. No.: 226,075

[22] Filed: Jan. 19, 1981

[30] Foreign Application Priority Data

Oct. 28, 1980 [JP] Japan .................... 55-151072

[51] Int. Cl.³ ............................................. H02G 1/12
[52] U.S. Cl. .......................... 81/9.51; 29/564.4
[58] Field of Search ............ 29/564.4, 33 M, 564.1, 29/564.2, 564.3; 81/9.51; 74/570

[56] References Cited

U.S. PATENT DOCUMENTS

| 710,865 | 10/1902 | Hollender | 74/570 |
| 3,368,428 | 2/1968 | Gudmestad | 81/9.51 |
| 3,590,666 | 6/1971 | Langer | 81/9.51 |
| 4,275,619 | 6/1981 | Shimizu | 81/9.51 |

Primary Examiner—Z. R. Bilinsky
Attorney, Agent, or Firm—Darby & Darby

[57] ABSTRACT

A wire cutter and stripper apparatus is disclosed. A crank means has a crank shaft rotatably mounted on a frame and a crank arm means fixedly mounted on the crank shaft. The crank arm means is operatively engaged to a cutter and stripper means. An actuator means is operable to rotate the crank shaft to move the cutter and stripper means toward an insulated wire fed intermittently through the wire cutter and stripper apparatus by a wire feed means.

3 Claims, 17 Drawing Figures

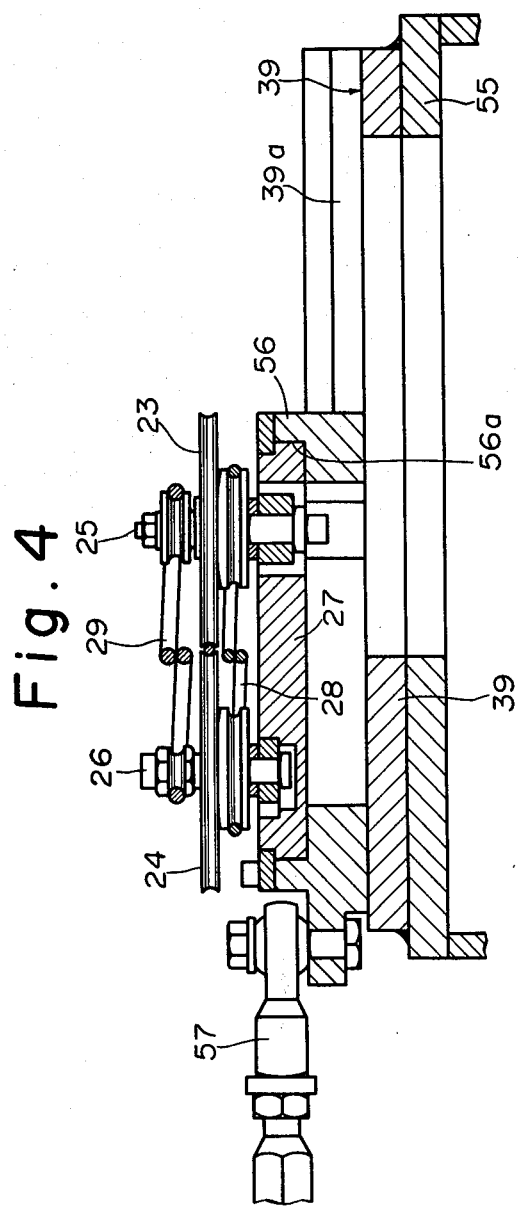

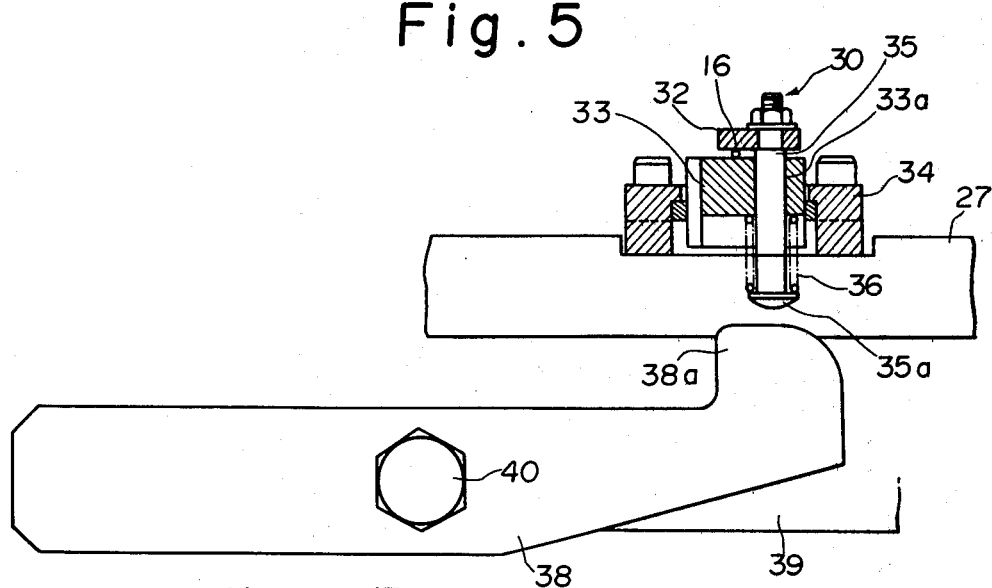
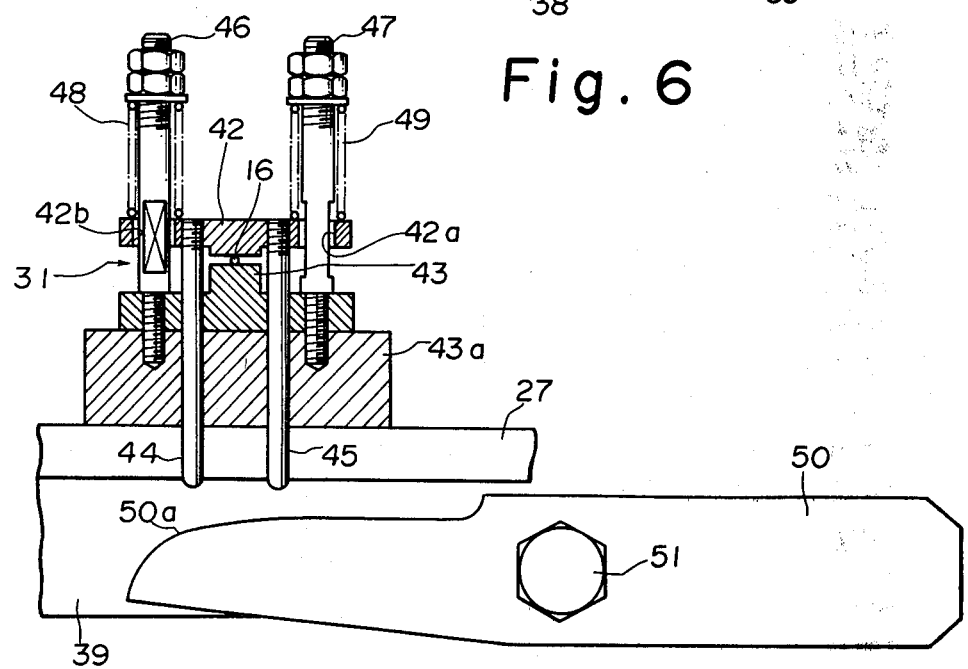

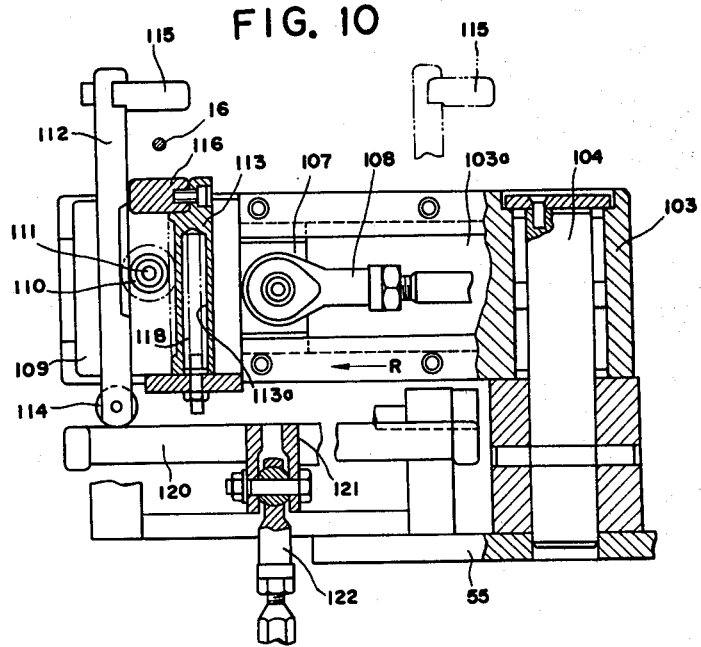
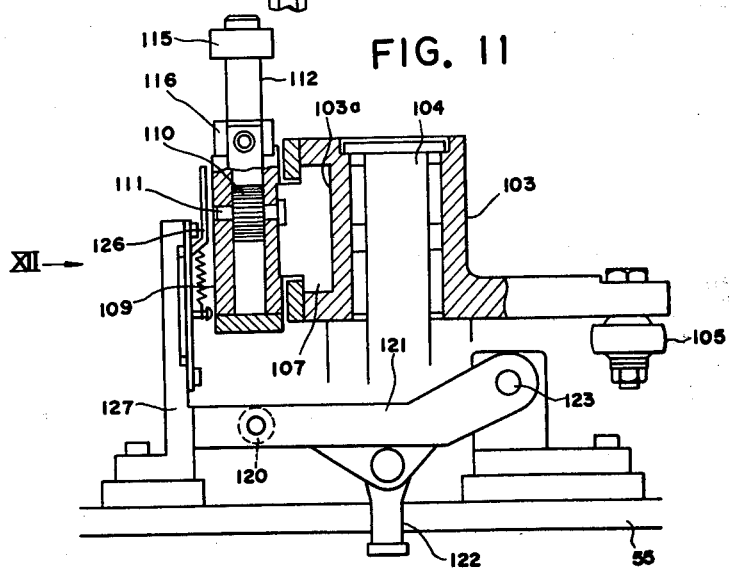

WIRE CUTTER AND STRIPPER APPARATUS

BACKGROUND OF THE INVENTION

1. Field of the Invention

This invention relates generally to a wire end processing apparatus and more particularly to a wire cutter and stripper apparatus incorporated in such wire end processing apparatuses.

2. Prior Art

FIGS. 16 and 17 show one known wire cutter and stripper apparatus of the type under consideration. A vertical guide member 150 is mounted on a frame 151 through a mounting member 152. A pair of first and second racks 153, 154 are mounted on the guide member for vertical movement therealong. A pinion 155 is rotatably mounted on the guide member and meshingly engages the first and second racks 153, 154. A pair of upper and lower blade holders 156, 157 are secured to the respective upper ends of the first and second racks 153, 154. A pair of upper stripper blades 158, 159 and an upper cutter blade 160 are carried by the upper blade holder 156 while the lower blade holder 157 carries a pair of lower stripper blades 161, 162 and a lower cutter blade 163. An actuator rod 164 is secured to the lower end of the first rack 153 for vertically moving the first rack 153. Thus, the upper and lower cutter and stripper blades are moved toward each other by the actuator rod 164 through the racks 153, 154 and pinion 155 to sever an insulated wire 165 and to cut through the insulation thereof on opposite sides of the line of severing of the wire, the insulated wire being intermittently fed by a predetermined length. With this construction, the actuator rod 164 and the cutter and stripper blades move at the same speed. Thus, the amount of movement of those blades is proportional to time, as shown in a solid in FIG. 15. As a result, the presence of any backlash and play in the drive system for the blades would adversely affect the cutting of the insulation of the wire by the stripper blades. More specifically, where the total amount of movement of the stripper blades does not reach a predetermined level, the insulation is not completely cut through by the stripper blades. This prevents the proper stripping operation. On the other hand, the total amount of movement exceeds the predetermined level, the stripper blades cut through the insulation into the wire. This is undesirable because the stripped end of the wire has a reduced mechanical strength.

SUMMARY OF THE INVENTION

It is therefore an object of this invention to provide a wire cutter and stripper apparatus in which the total amount of movement of stripper blades is kept accurately to a predetermined level regardless of backlash and play in a drive system for the blades.

According to the present invention, there is provided a wire cutter and stripper apparatus which comprises a frame; a wire feed means on the frame for advancing an insulated wire by a predetermined length; a cutter and stripper mechanism including a cutter means mounted on the frame, a stripper means mounted on the frame, a crank means having a crank shaft rotatably mounted on the frame and a crank arm means fixedly mounted on the crank shaft, and an actuator means operable to rotate the crank shaft to move the cutter and stripper means toward the insulated wire to cut the wire and the insulation, respectively, the crank arm means being operatively engaged to the cutter and stripper means; a moving means mounted on the frame and operable to move the clamp means away from the cutter means and stripper means after the cutter means and the stripper means cut the wire and the insulation, respectively.

Other advantages, features and additional objects of the present invention will become manifest to those versed in the art upon making reference to the detailed description and the accompanying sheets of drawings in which a preferred embodiment incorporating the principles of the present invention is shown by way of an illustrative example.

BRIEF DESCRIPTION OF THE DRAWINGS

FIG. 4 is a cross-sectional view taken along the line IV—IV of FIG. 3;

FIG. 5 is a cross-sectional view of a first clamp means;

FIG. 6 is a cross-sectional view of a second clamp means;

FIG. 10 is a partly broken, side elevational view of the second moving mechanism as viewed in the direction X of FIG. 9;

FIG. 11 is a partly broken, elevational view of the second moving mechanism as viewed in the direction XI of FIG. 9;

DESCRIPTION OF THE PREFERRED EMBODIMENT

Figure 1:
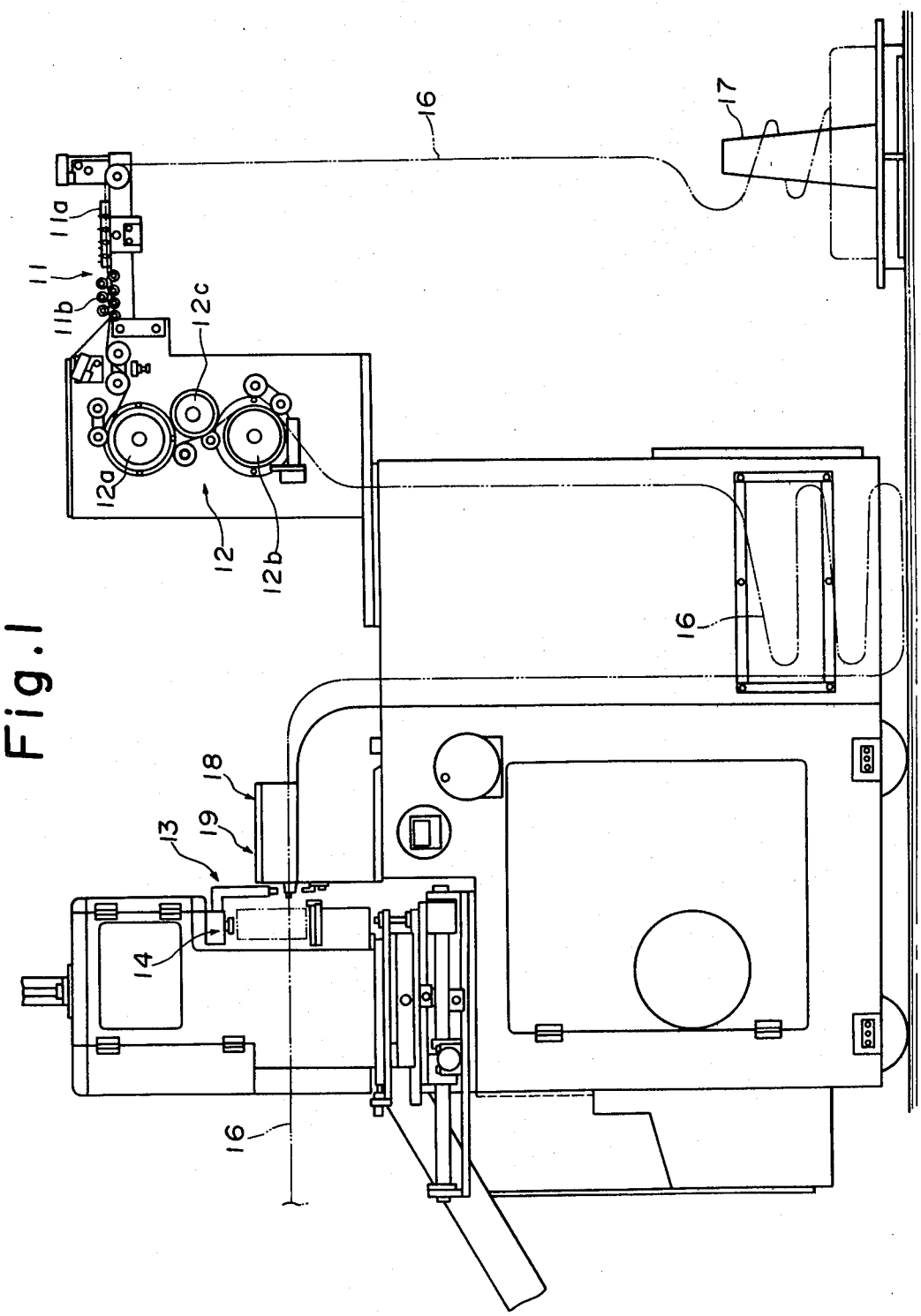
FIG. 1 is a front elevational view of a wire end processing apparatus.
Figure 2:
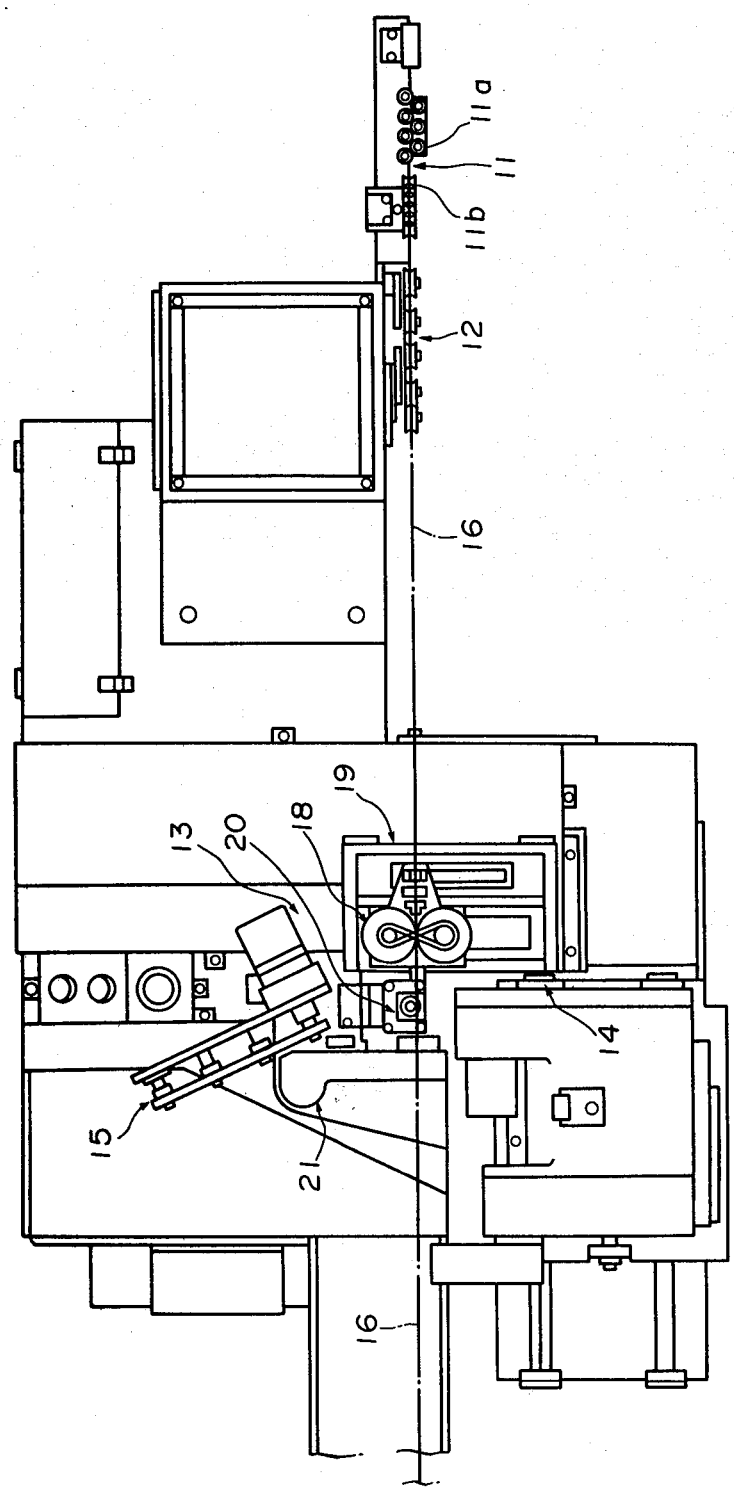
FIG. 2 is a top plan view of the apparatus.

FIGS. 1 and 2 show apparatus 10 for processing ends of an insulated wire. The apparatus 10 comprises a wire straightening means 11, a wire length measuring means 12, a cutter and stripper assembly 13, a terminal fastening device 14 and a conveyor means 15. The wire straightening means 11 includes a pair of roller assemblys 11a, 11b, the roller assembly 11a having a first row of side rollers and a second row of side rollers urged against the first row of rollers while the roller assembly 11b has a row of upper rollers and a row of lower rollers urged against the row of upper rollers. The insulated wire 16 supplied from a spool 17 passes between the first and second rows of rollers of the roller assembly 11a and the rows of upper and lower rollers of the roller assembly 11b. The wire straightening means 11 serves to straighten the wire 16 which has been wound around the spool 17. The wire length measuring device 12 comprises a drive pulley 12a, a driven pulley 12b and encorder 12c disposed therebetween. The wire 16 transported from the wire straightening means 12 is passed through the drive and driven pulleys 12a, 12b, the wire being held taut between the two pulleys 12a, 12b. The encorder 12c is held in contact with the insulated wire 16 for rotation so that the encorder feeds a sensing signal to a drive means (not shown) to stop the same after a predetermined length of wire 16 is delivered through the wire length measuring device 12, the drive means serving to drive the drive pulley 12a for rotation. Thus, the wire 16 is intermittently advanced by the predetermined length.

According to an important aspect of the present invention, there is provided the cutter and stripper assembly 13 which comprises a wire feed means 18, a first moving mechanism 19, a cutter and stripper mechanism 20 and a second moving mechanism 21.

Figure 3:
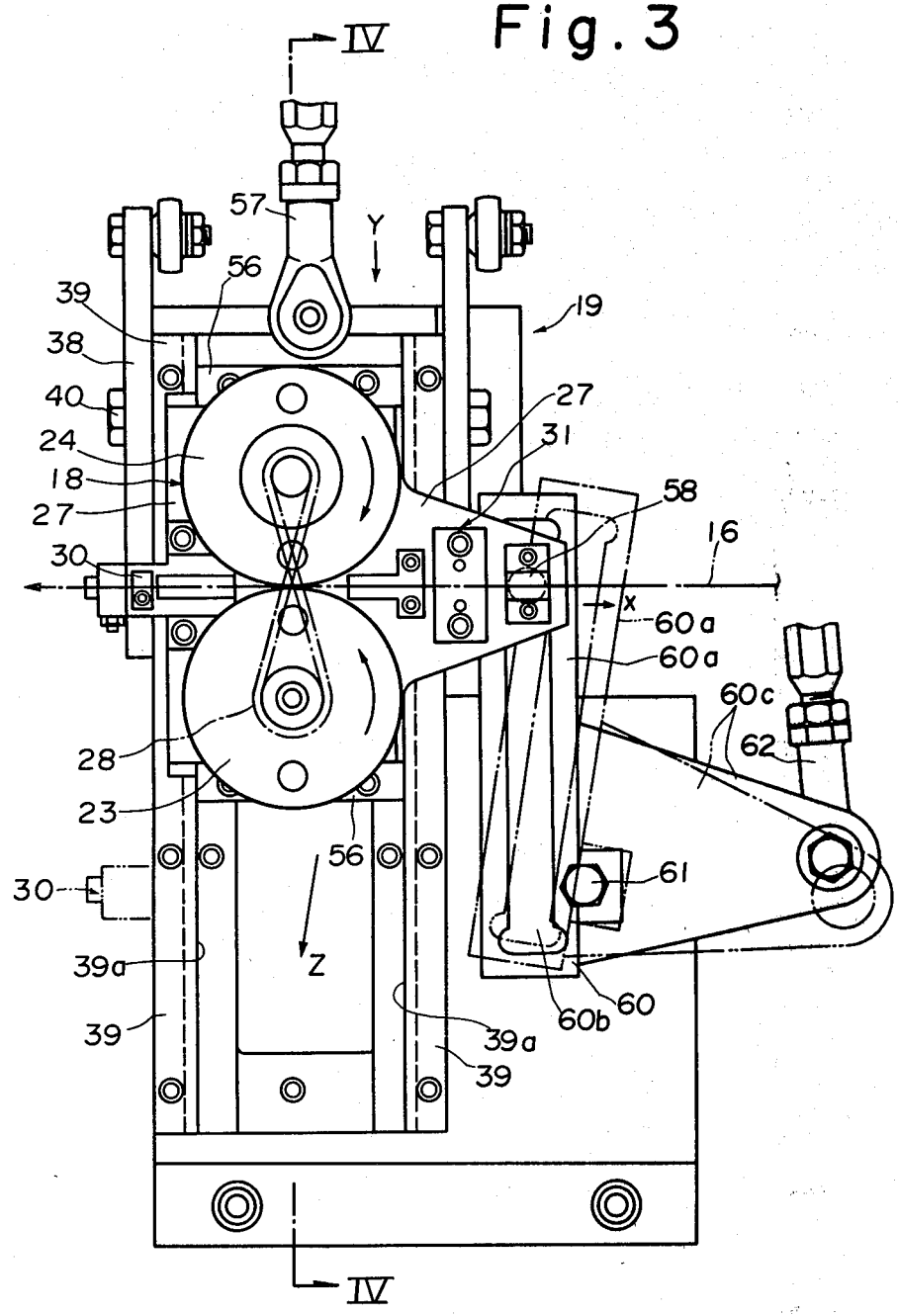
FIG. 3 is a top plan view of a first moving mechanism and wire feed means.

Referring to FIGS. 3 and 4, the wire feed means 18 comprises a pair of drive and driven pulleys 23, 24 mounted on respective shafts 25, 26 which are rotatably mounted on a movable table 27, the two pulleys 23, 24 being disposed in opposed relation to each other. The shaft 25 is connected to a drive means (not shown) for being driven for rotation. The drive and driven pulleys 23, 24 are rotated in opposite directions by a crossloaded belt 28 arranged thereon. The two pulleys 23, 24 are urged toward each other by a spring 29 arranged on the shafts 25, 26 so that the insulated wire 16 is gripped by the peripheries of the pulleys 23, 24. Thus, the wire 16 is intermittently advanced by the pulleys 23, 24 by a predetermined length.

As best shown in FIG. 3, a first clamp means 30 and a second clamp means 31 are provided on the movable table 27 in the path of travel of the insulated wire 16, these clamp means 30, 31 serving to clamp the wire 16 against movement. As shown in FIG. 5, the first clamp means 30 comprises a pair of opposed upper and lower jaws 32, 33, the lower jaw 33 being secured to the movable table 27 through a mounting means 34 and having a vertical hole 33a formed therethrough. A pin 35 is slidably received in the hole 33a and has an upper end secured to the upper jaw 32, the pin having a head portion 35a at its lower end. A coil spring 36 is wound around the pin 35 and acts between the head portion 35a and the underside of the lower jaw 33 so that the upper jaw 32 is normally urged toward the lower jaw 33 under a predetermined load. An actuator arm 38 is pivotally mounted on a guide member 39 by a shaft 40, and is engageable at one end 38a with the head portion 35a to urge the upper jaw 32 away from the lower jaw 33. The actuator arm 38 is actuated by a drive means (not shown). The insulated wire 16 is introduced between and gripped by the upper and lower jaws 32, 33.

As shown in FIG. 6, the second clamp means 31 includes a pair of opposed upper and lower jaws 42, 43, the lower jaw 43 being secured to the movable table 27 through a mounting means 43a. A pair of pins 44, 45 are secured at their upper ends to the upper jaw 42 and slidably extend through the lower jaw 43, the mounting means 43a and the movable table 27, the lower ends of the pins 44, 45 extending downwardly from the movable table 27. A pair of stud bolts 46, 47 are loosely fitted in respective apertures 42a, 42b of the upper jaw 42 and extend into the lower jaw 43 and the mounting means 43a. A pair of coil springs 48, 49 are mounted around the stud bolts 46, 47, respectively, and act between the upper surface of the upper jaw 42 and the upper portions of the stud bolts 46, 47. With this arrangement, the upper jaw 42 is normally urged by the coil springs 48, 49 toward the lower jaw 43. An actuator arm 50 is pivotally mounted on the guide member 39 by a shaft 51, and is engageable at one end 50a with the lower ends of the pins 44, 45 to urge the upper jaw 42 away from the lower jaw 43. The actuator arm 50 is actuated by a drive means (not shown). The insulated wire 16 is introduced between and gripped by the upper and lower jaws 42, 43. The cooperating surfaces of jaws 32, 33 and jaws 42, 43 are made coarse to facilitate the gripping of the wire 16.

Referring to FIGS. 3 to 6, the first moving mechanism 19 includes the guide member 39 mounted on a frame 55, the guide member 39 being disposed horizontally and having a guide groove 39a extending perpendicular to the path of travel of the insulated wire 16. A cross slide 56 is mounted on the guide member 39 and is movable along the guide groove 39a. The cross slide 56 has a guide groove 56a extending parallel to the path of travel of the insulated wire 16. The movable table 27 is mounted on the cross slide 56 and is movable along the guide groove 56a. A piston rod 57 is connected to the cross slide 56 to actuate the same to move along the guide groove 39a. A guide roller 58 is secured to the underside of the movable table 27. A pivotal member 60 is pivotally mounted on the frame 55 by a bolt 61, the pivotal member 60 having an elongated portion 60a with a guide groove 60b normally disposed perpendicular to the path of travel of the insulated wire 16. The guide roller 58 is received in the guide groove 60b for movement therealong. The pivotal member 60 has an arm portion 60c to which an actuator rod 62 is connected to actuate the pivotal member 60 to be pivotally moved about the shaft 61. The actuator rod 62 is actuated by a drive means (not shown).

Figure 7:
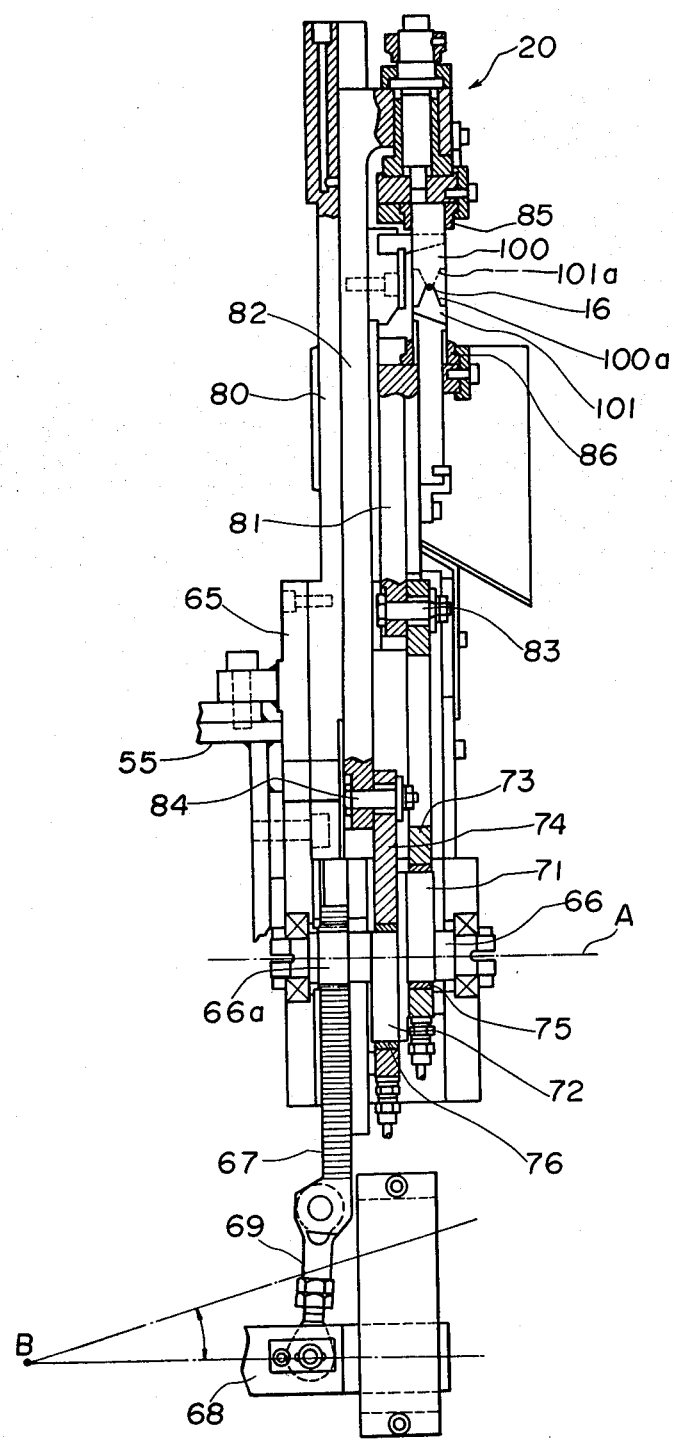
FIG. 7 is a partly broken, side elevational view of a cutter and stripper mechanism.
Figure 8:
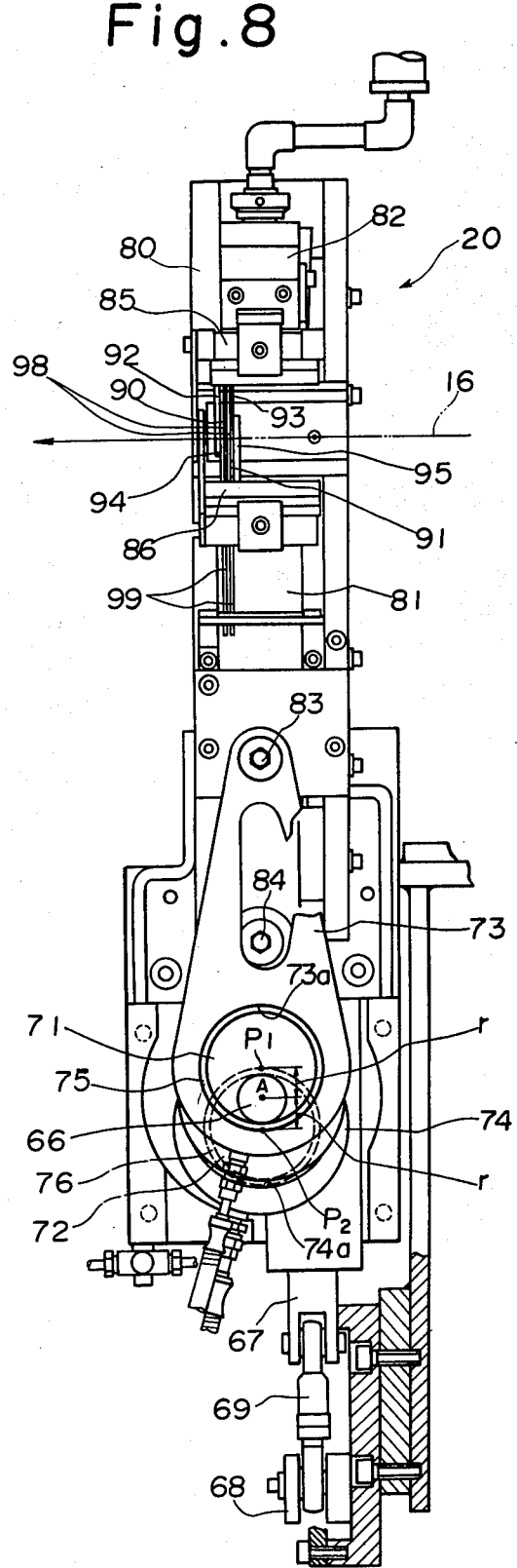
FIG. 8 is a front elevational view of the cutter and stripper mechanism.

According to an important aspect of the present invention, the cutter and stripper mechanism 20 is provided. Referring to FIGS. 7 and 8, a vertical mounting member 65 is mounted on the frame 55. A crank shaft 66 is supported by the mounting member 65 for rotation about its axis A disposed horizontally. A pinion 66a is formed on one end portion of the crank shaft 66, the pinion 66a meshingly engaging a rack 67 supported by the mounting member 65 for vertical movement. The rack 67 is coupled at its lower end to an actuator 68 through a connecting link 69, the actuator 68 being driven by a drive means (not shown) for swinging movement about its pivot point B as indicated in phantom in FIG. 7 so that the rack 67 is vertically moved to rotate the crank shaft 66 through the pinion 66a. A pair of eccentric discs 71, 72 of the same diameter are mounted on the crank shaft 66 for rotation therewith. The two discs 71, 72 are mounted on the crank shaft 66 in diametrically opposed relation, and the centers $P_1$, $P_2$ of the two discs 71, 72 are offset by an equal distance r from the axis A of the crank shaft 66 in opposite directions. Thus, the centers $P_1$, $P_2$ lie in a common line passing through the axis A of the crank shaft 66. A pair of elongated connecting members 73, 74 of identical make have identical circular apertures 73a, 74a formed therethrough, respectively. The pair of eccentric discs 71, 72 are rotatably fitted in the respective apertures 73a, 74a through annular bearing members 75, 76. A vertical guide member 80 is secured to the mounting member 65 and extends upwardly beyond it. A pair of elongated slide members 81, 82 are mounted on the guide member 80 for vertical sliding movement therealong, the two slide members being slidable independently of each other. The lower ends of the slide members 81, 82 are pivotally connected by pins 83, 84 to the upper ends of the connecting members 73, 74, respectively. A pair of opposed upper and lower cutter holders 85, 86 are secured to the upper ends of the slide members 82, 81, respectively. As shown in FIG. 8, the insulated wire 16, fed from the wire feed means 18, is passed between the upper and lower cutter holders 85, 86 from right to left.

A pair of upper and lower cutter blades 90, 91 are mounted on the upper and lower cutter holders 85, 86, respectively. A pair of upper stripper blades 92, 93 are mounted on the upper cutter holder 85 on opposite sides of the upper cutter blade 90. Similarly, a pair of lower stripper blades 94, 95 are mounted on the lower cutter holder 86 on opposite sides of the lower cutter blade 91. The upper and lower stripper blades 92, 94 and the upper and lower stripper blades 93, 95 cooperate respectively to cut through the insulation of the insulated wire 16 on opposite sides of the cutter blades 90, 91. Insulation removing elements 98, 99 are fixedly mounted on the guide member 80 for removing the severed insulations disposed between the cutter blades and the respective stripper blades. A pair of centering plates 100, 101 are mounted on the upper and lower cutter holders 85, 86, respectively, the centering plates 100, 101 having a pair of cooperating V-shaped notches 100a, 101a for placing the insulated wire 16 at a proper position during the cutting and stripping operation.

Figure 12:
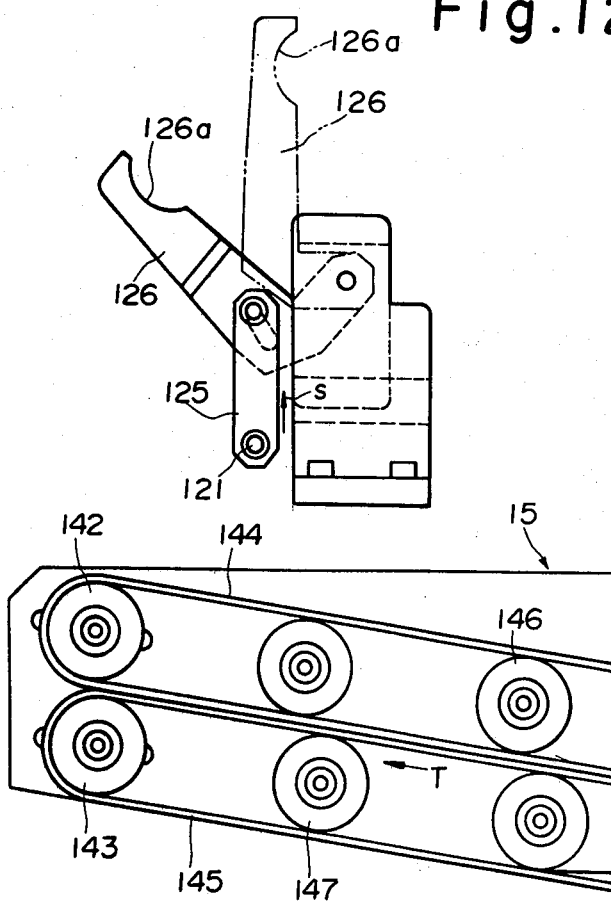
FIG. 12 is an elevational view of a guide plate as viewed in the direction XII of FIG. 11.

The second moving mechanism 21 is described with reference to FIGS. 9 to 12. A pivotal member 103 is pivotally mounted on the frame 55 by a pivot shaft 104 and disposed horizontally. An actuator rod 105 is connected to the pivotal member 103 for pivotally moving the same. The actuator rod 105 is actuated by a drive means (not shown). The pivotal member 103 has at one side a guide groove 103a of a channel-shaped cross-section which is normally disposed perpendicular to the path of travel of the insulated wire 16. A movable block 107 is received in the guide groove 103a for movement therealong. An actuator rod 108 is connected to the movable block 108 for moving the same along the guide groove 103a, the actuator rod 108 being actuated by a drive means (not shown). A casing 109 is mounted on the movable block 107, and a pinion 110 is rotatably mounted within the casing 109 by a shaft 111. A pair of first and second racks 112, 113 are vertically movably mounted in the casing 109, the two racks 112, 113 being in mesh with the pinion 110 interposed therebetween. A roller 114 is rotatably mounted on the lower end of the first rack 112. An upper jaw 115 is secured to the upper end of the first rack 112 while a lower jaw 116 is secured to the upper end of the second rack 113 in opposed relation to the upper jaw 115. The second rack 113 has a vertical bore 113a therein in which a coil spring 118 is received for urging the second rack upwardly so that the insulated wire 16 is gripped by the jaws 115, 116. Thus, the jaws 115, 116 constitutes a wire clamp means. The opposed surfaces of the jaws 115, 116 are made coarse to facilitate the gripping operation. An operating rod 120 is disposed in vertically registry with the roller 114 so as to be engageable with the roller for upwardly moving the first rack 112, with the upper jaw 115 moved apart from the lower jaw 116 through the pinion 110. The rod 120 is disposed parallel to the guide groove 103a and connected at one end to an actuator arm 121. The actuator arm 121 is actuated by an actuator rod 122 for pivotal movement about a pivot pin 123 so that the first rack 112 is moved upwardly through the operating rod 120. As best shown in FIG. 12, a link 125 is connected at one end to one end of the actuator arm 121 and at the other end to a guide plate 126 having a notch 126a. The guide plate 126 is pivotally mounted on a mounting means 127 on the frame 55, the guide plate being normally spring biased to a position shown in a solid line in FIG. 12. The pivotal movement of the actuator arm 121 causes the guide plate 126 to move into a position shown in phantom in FIG. 12. The guide plate 126 is disposed between the second moving mechanism 21 and the conveyor means 15. The notch 126a serves to hold the end of the severed wire.

Figure 13:
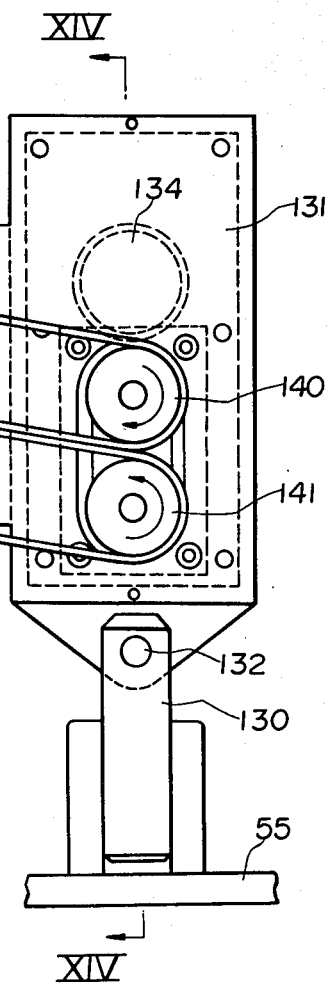
FIG. 13 is a front elevational view of a conveyor means.
Figure 14:
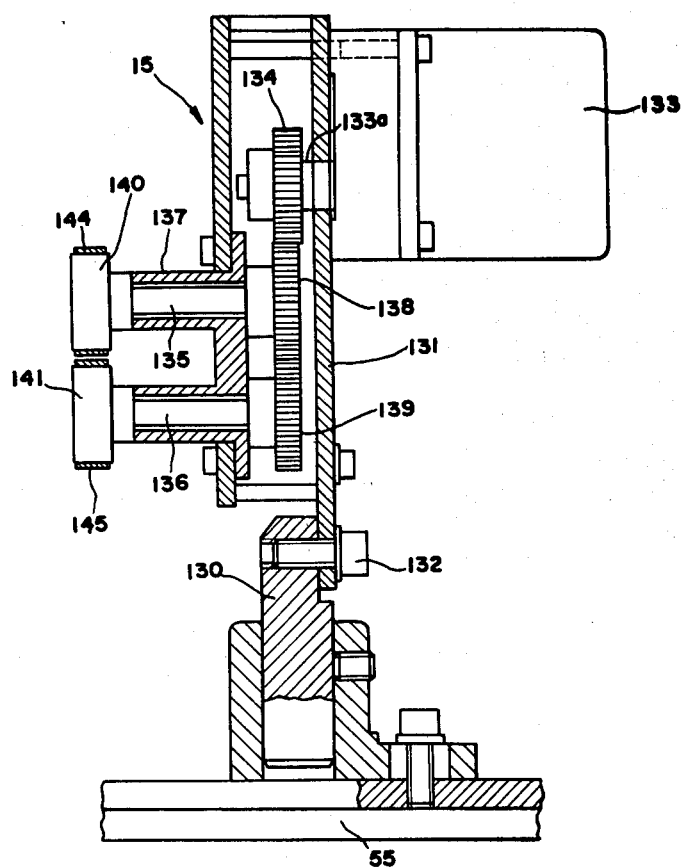
FIG. 14 is a cross-sectional view of the conveyor means taken along the line XIV—XIV of FIG. 13.

The conveyor means 15 is described with reference to FIGS. 13 and 14. An upstanding support member 130 is mounted on the frame 55, and a mounting member 131 is mounted on the support member 130 by a bolt 132. A motor 133 is mounted on the mounting member 131, and a gear 134 is mounted on a drive shaft 133a of the motor 133. A pair of shafts 135, 136 are rotatably mounted on the mounting member 131 through a bearing member 137. A pair of gears 138, 139 are mounted on one ends of the shafts 135, 136, respectively. The gear 134 is in mesh with the gear 138 which is in mesh with gear 139. With this arrangement, when the motor 133 is powered, the gears 138, 139 are rotated in opposite directions. A pair of opposed drive pulleys 140, 141 are fixedly mounted on the other ends of the shafts 135, 136. A pair of opposed driven pulleys 142, 143 are rotatably mounted on the mounting member 131, and a pair of belts 144, 145 extend around the respective drive and driven pulleys 140, 141, 142, 143 as shown in FIG. 13. Guide pulleys 146, 147 are arranged between each pair of drive and driven pulleys and rotatably mounted on the mounting member 131. The lower flight of the belt 144 and the upper flight of the belt 145 is held in contact with each other, the lower flight and the upper flight being moved in a direction T when the motor 133 is energized. When the guide plate 126 is moved to the position shown in phantom in FIG. 12 with the severed wire length held in the notch 126a, the wire length is held at one end between the aforesaid lower flight and upper flight and conveyed into a storage position in an orderly manner.

When the first clamp means 30 clamps the severed wire and is moved to a position shown in phantom in FIG. 3 by the first moving mechanism 19, the terminal fastening device 14 serves to automatically fasten a terminal to the leading end of the wire.

A mode of operation of the wire end processing apparatus 10 will now be described.

Figure 15:
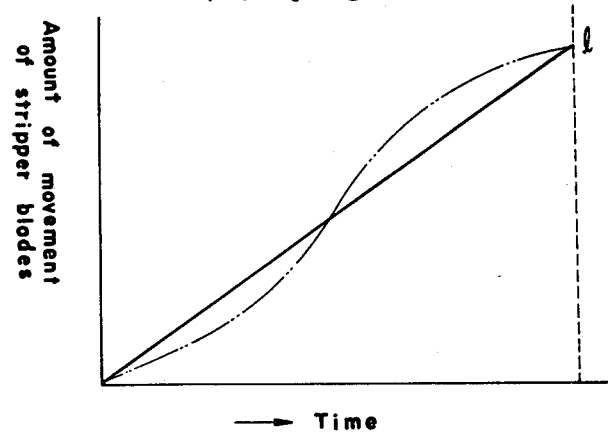
FIG. 15 is a graph showing the relation between time and the amount of movement of stripper blades.
Figure 16:
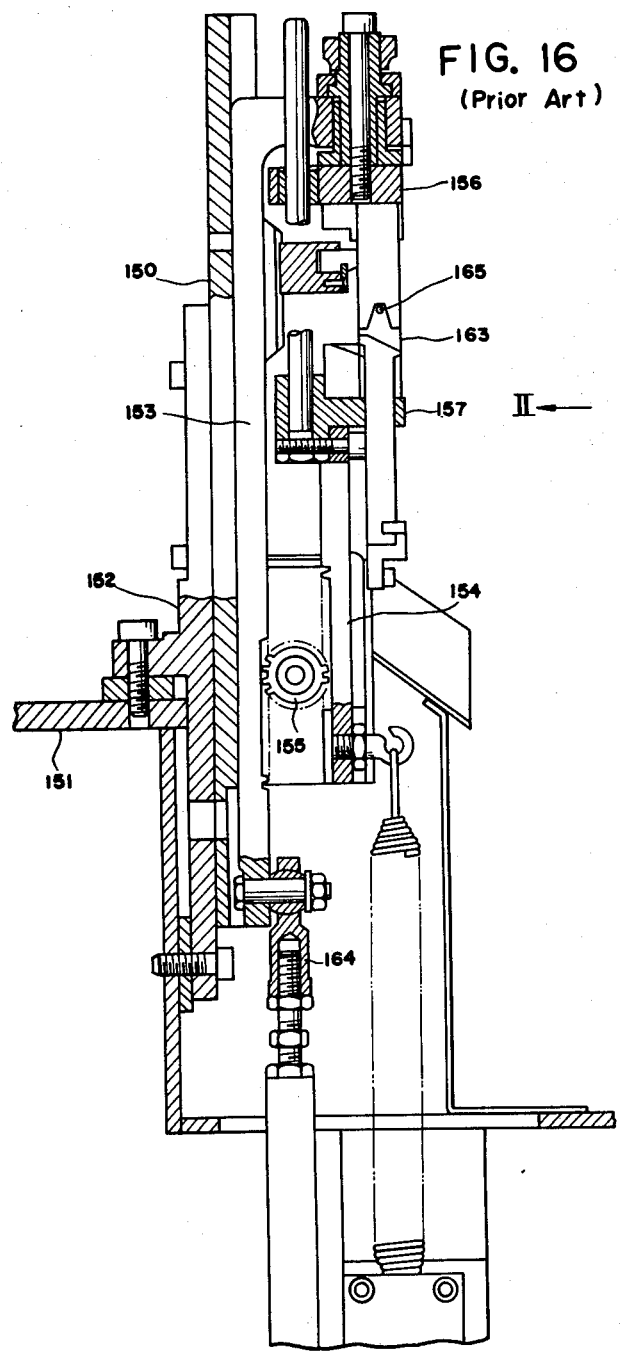
FIGS. 16 and 17 are elevational views of cutter and stripper mechanism according to the prior art.
Figure 17:
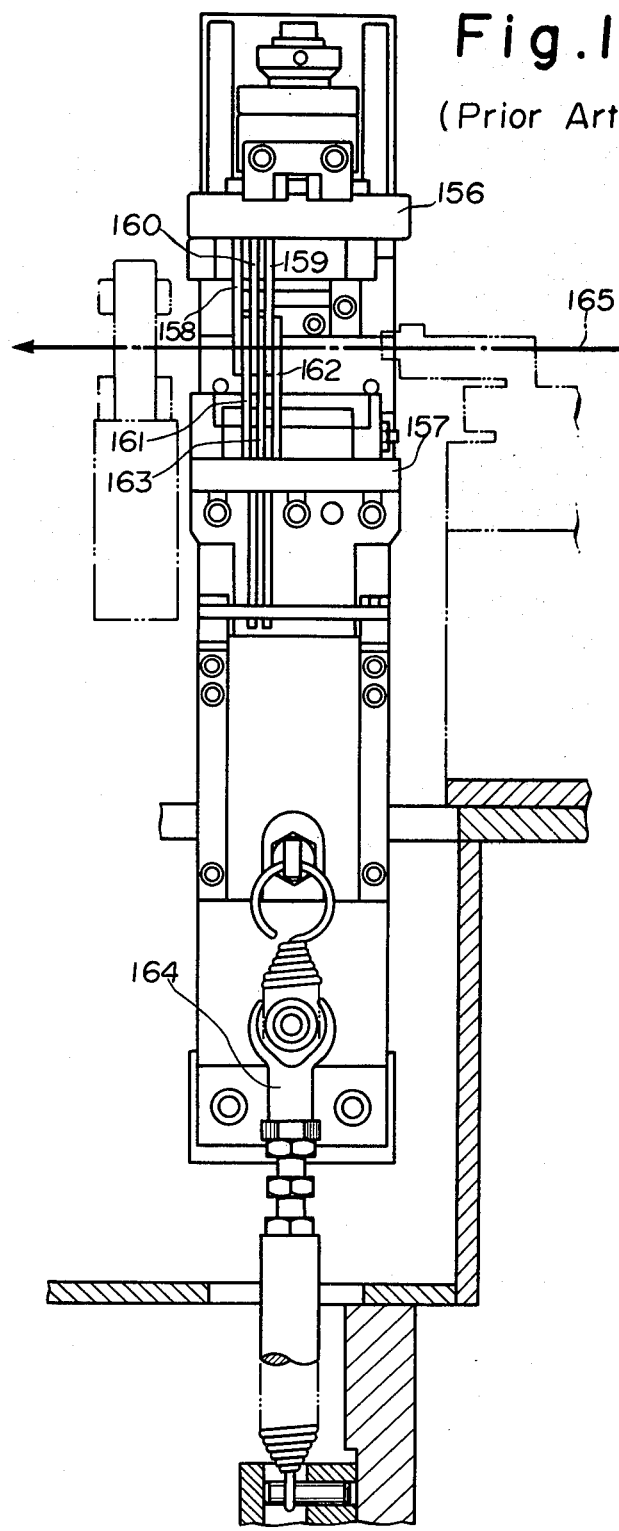

The insulated wire 16 is supplied from the spool 17 and passes through the wire straightening means 11. Then, the wire 16 is intermittently advanced by the predetermined length by the wire length measuring device 12. The wire 16 is advanced by the wire feed means 18 through the first moving mechanism 19 and the cutter and stripper mechanism 20 into the second moving mechanism 21. The wire 16 is intermittently advanced by a predetermined length by the wire feed means 18 whereupon the rotation of the drive pulley 23 is stopped by means of an associated microswitch (not shown). The pair of jaws 32, 33 of the first clamp means 30 and the pair of jaws 42, 43 of the second clamp means 31 are respectively held apart from each other by the respective actuator arms 38, 50 urging the pin 35 and the pins 44, 45 upwardly. The pair of jaws 115, 116 are held apart from each other by the rod 120 urging the first rack 112 upwardly. Similarly, the upper and lower cutter and stripper blades are held apart from each other. When the rotation of the drive pulley 23 is stopped, the actuator arms 38 and 50 are angularly moved downwardly (FIGS. 5 and 6) so that the insulated wire 16 is gripped by the jaws 32, 33 and the jaws 42, 43. Simultaneously, the actuator arm 121 is angularly moved downwardly (FIG. 11) about the pin 123 by the actuator rod 122, and the operating rod 120 is moved downwardly (FIG. 10) to move the first rack 112 upwardly and to move the second rack 113 through the pinion 110 and the spring 118 so that the insulated wire 16 is gripped by the jaws 115, 116. Then, the cutter and stripper mechanism 20 is actuated to sever the wire 16 and cut through the insulation thereof on opposite sides of the line of severing of the wire. More specifically, the actuator 68 is angularly moved counterclockwise (FIG. 7) about the pivot point B so that the crank shaft 66 is rotated 180° into the position shown in FIGS. 7 and 8, the rotation of the crank shaft being effected through the rack 67 and pinion 66a. During this rotation of the crank shaft 66, the eccentric discs 71, 72 serve as crank arm means, and the slide member 82 is gradually moved downwardly while the slide member 81 is gradually moved upwardly so that the upper and lower blade holders 85, 86 are moved toward each other. Thus, the upper and lower cutter blades 90, 91 cooperate to sever the insulated wire 16, and simultaneously with the severing of the wire, the upper and lower stripper blades 92, 94 and the upper and lower stripper blades 93, 95 cut through the insulation of the insulated wire on opposite sides of the line of severing of the wire. The relation between time and the amount of movement of the upper and lower cutter and stripper blades is shown in a broken line in a graph in FIG. 15 wherein l is the total amount of movement of these blades. When the angle between the vertical line and the line passing through the axis A of the crank shaft 66 and the centers $P_1$ and $P_2$ of the eccentric discs 71, 72 is small, that is to say, at an initial and a final portion of the stroke of the cutter and stripper blades, the amount of movement of these blades per unit time is small. Thus, by virtue of the provision of the eccentric discs 71, 72 mounted on the crank shaft 66, the amount of movement of the blades relative to the amount of angular movement of the actuator 68 is small at a final portion of the stroke of the blades. This ensures that the total amount of movement of the cutter and stripper blades is kept accurately to a predetermined level regardless of backlash and play in the drive system for these blades. Thus, the upper and lower stripper blades 92, 93, 94, 95 properly cut through the insulation of the insulated wire 16. Actually, the broken line in FIG. 15, showing the relation between time and the amount of movement of the blades, is represented in a slightly modified form due to the presence of the connecting link 69.

After the wire 16 is severed with the insulation cut through, the first moving mechanism 19 is actuated. More specifically, the pivotal member 60 is rotated about the shaft 61 by the actuator rod 62 into the position shown in phantom in FIG. 3 so that the movable table 27 is moved in the direction X to strip the insulation from the leading end of the wire held by the clamp means 30, 31. Subsequently, the actuator rod 57 is moved in the direction Y so that the cross slide 56 is moved in the direction Z with the guide roller 58 moving along the guide groove 60b. In this condition, the leading end of the wire is positioned in the terminal fastening device 14 where a terminal is automatically fastened to the leading end of the wire. Then, the movable table 27 is returned to its initial position shown in FIG. 3.

Figure 9:
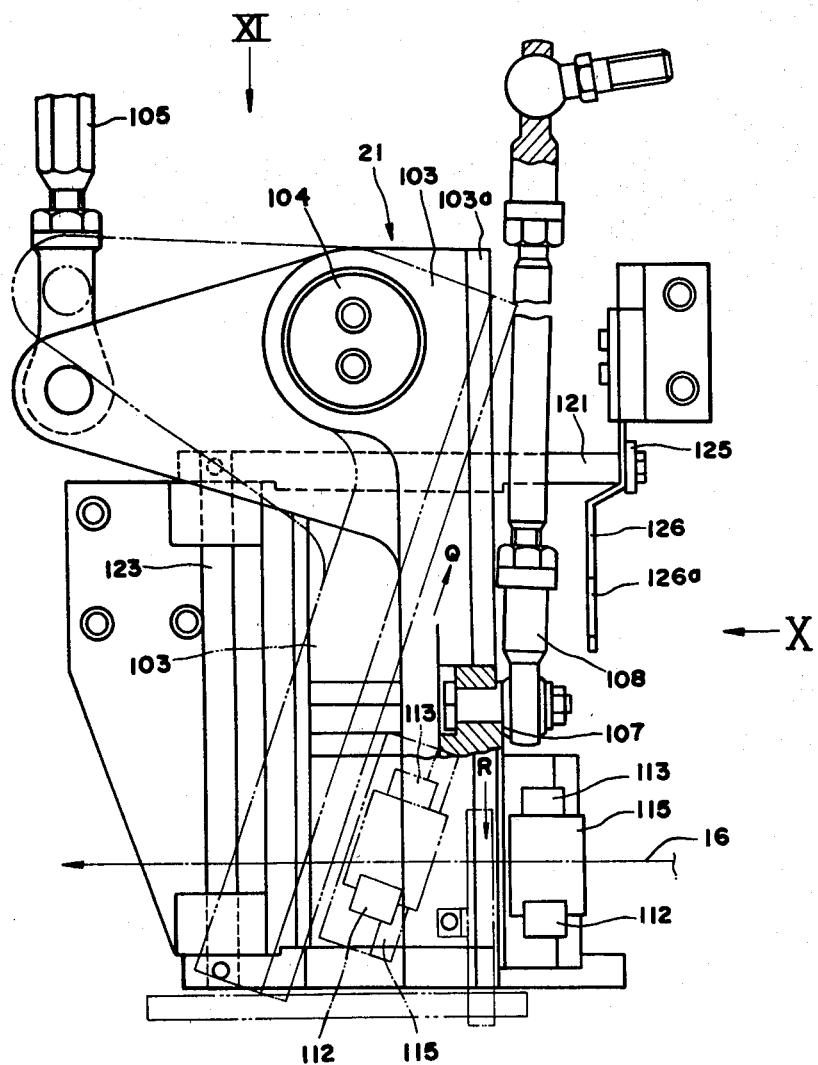
FIG. 9 is a fragmentary top plan view of a second moving mechanism.

Simultaneously with the operation of the pivotal member 60, the pivotal member 103 of the second moving mechanism 21 is rotated about the shaft 104 by the actuator rod 105 into the position shown in phantom in FIG. 9 so that the jaws 115, 116 are moved in a left hand direction to strip the insulation from the trailing end of the severed wire length. Subsequently, the movable block 107 is moved along the guide groove 103a by the actuator rod 108 in the direction Q, the casing 109 being moved together with the movable block 107. In this condition, the jaws 115, 116 holding the wire length is positioned adjacent to the guide plate 126 with the trailing end portion of the wire length received in the notch 126a. Then, the operating rod 120 is moved upwardly by the actuator rod 122 through the actuator arm 121 to move the first rack 112 through the roller 14 so that the jaws 115, 116 are moved apart from each other. At this time, the guide plate 126 is rotated into the position shown in phantom in FIG. 12 so that the trailing end of the wire length is moved toward and held by the conveyor belts 144, 145 and conveyed in the direction T (FIG. 13) into the storage position. Then, the pivotal member 103 and the movable block 107 are returned by the actuator rods 105, 108 into their initial positions shown in a solid line in FIGS. 9 and 10.

While the wire end processing apparatus, incorporating the cutter and stripper assembly has been specifically shown and described herein, the invention itself is not to be restricted by the exact showing of the drawings or the description thereof. For example, the second moving mechanism 21 may be identical in construction to the first moving mechanism 19, and another terminal fastening device may be provided to cooperate with such a second moving mechanism to fasten a terminal to the trailing end of the wire length.

What is claimed is:

1. A wire cutter and stripper apparatus which comprises:
   a frame;
   a wire feed means on said frame for advancing an insulated wire by a predetermined length;
   a cutter and stripper mechanism including (1) a crank means having a crank shaft rotatably mounted on said frame and a pair of identical crank arms in the form of discs fixedly mounted on said crank shaft in eccentric relation so that the centers of said discs are offset from the axis of said crank shaft by an equal distance, said eccentric discs being disposed in diametrically opposed relation, (2) a pair of elongated connecting members each having a circular aperture formed therethrough at one end thereof, said pair of eccentric discs being rotatably received in said circular apertures of said connecting members, (3) a pair of slide members having first and second ends and being mounted on said frame for movement along axes thereof, said first ends of said slide members being pivotally connected to the other ends of said connecting members, respectively, (4) a pair of opposed cutter and stripper holders mounted respectively on said second ends of said slide members, said cutter and stripper holders holding respective cutter blades and stripper blades, and (5) an actuator means operable to move said crank shaft through a predetermined angle and thereby to move said cutter and stripper holders towards each other with a nonuniform motion which has a low speed at the beginning and end thereof and a higher speed in the middle thereof so that said cutter blades and said stripper blades cut the wire and the insulation, respectively, to the same depth regardless of backlash and play in said apparatus.

2. A wire cutter and stripper apparatus according to claim 1, further including a rack supported on said frame for movement along an axis thereof, said crank shaft having a pinion portion which meshingly engages said rack, and said actuator means being operatively engaged to said rack for moving it along its axis thereby to move said crank shaft angularly.

3. A wire cutter and stripper apparatus according to claim 1, and further including wire clamp means comprising a pair of first and second wire clamps disposed on opposite sides of said cutter and stripper mechanism, said moving means comprising a pair of first and second moving mechanisms operable respectively to first move said first and second wire clamps away from said cutter and stripper mechanism along the path of movement of the insulated wire and then to move said first and second wire clamps in a direction transverse to the path of movement of the insulated wire.

* * * * *